L. H. L. BELLEM & G. JEAN-BAPTISTE BRÉGÉRAS.
INTERNAL COMBUSTION ENGINE.
APPLICATION FILED AUG. 17, 1909.

1,038,830.

Patented Sept. 17, 1912.

2 SHEETS—SHEET 1.

Witnesses:-
Henry Thieme,
F. George Barry.

Inventors:-
Louis Henri L'bert Bellem
and
Gaston Jean-Baptiste Brégéras
by their attorneys L. H. L. BELLEM & G. JEAN-BAPTISTE BRÉGÉRAS.
INTERNAL COMBUSTION ENGINE.
APPLICATION FILED AUG. 17, 1909.

1,038,830.

Patented Sept. 17, 1912.

2 SHEETS—SHEET 2.

UNITED STATES PATENT OFFICE.

LOUIS HENRI LIBERT BELLEM AND GASTON JEAN-BAPTISTE BRÉGÉRAS, OF NEUILLY-SUR-SEINE, FRANCE.

INTERNAL-COMBUSTION ENGINE.

1,038,830.   Specification of Letters Patent.   Patented Sept. 17, 1912.

Application filed August 17, 1909. Serial No. 513,261.

*To all whom it may concern:*

Be it known that we, LOUIS HENRI LIBERT BELLEM and GASTON JEAN-BAPTISTE BRÉGÉRAS, citizens of the Republic of France, and residents of 60 Boulevard d' Asnières, Neuilly-sur-Seine, Seine, in the said Republic, engineers, have invented a new and useful Internal-Combustion Engine, of which the following is a specification.

The present internal combustion engines working with oils of low volatility, especially heavy petrols, have the drawback either that, in order to start them, the fuel has to be heated by some means, or that they have to be started by use of spirit or a volatile combustible. This necessitates complications in the admission devices and prevents absolutely direct and instantaneous starting, for which reasons engines of this kind are seldom used in practice.

The invention relates to a four stroke cycle engine for heavy combustibles, such as illuminating petroleum oil, adapted to be started directly and instantaneously, without using any of the known expedients. The petroleum is supplied to the cylinder in a fine spray by suction, and the necessary air is only introduced later in such a manner as to produce the necessary mixing, and to make the mixture homogeneous.

The cylinder of the engine has a special admission valve which is opened by suction and constitutes a pulverizer with two series of angular passages. Through one of these series of jets the petroleum is supplied in a predetermined quantity and also a very small quantity of air serving for its preliminary pulverization, while through the other series of jets is supplied the air necessary for complete pulverization. The lower part of the cylinder has a series of openings through which at the end of the stroke air is suddenly admitted, which with the pulverized petroleum, forms a moisture easily inflammable by the electric spark. The petroleum is supplied under pressure to the pulverizer.

In the accompanying drawings an example of the invention is shown.

Figure 1:
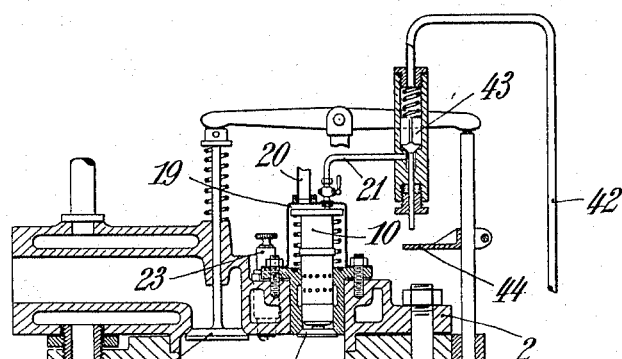
Figure 2:
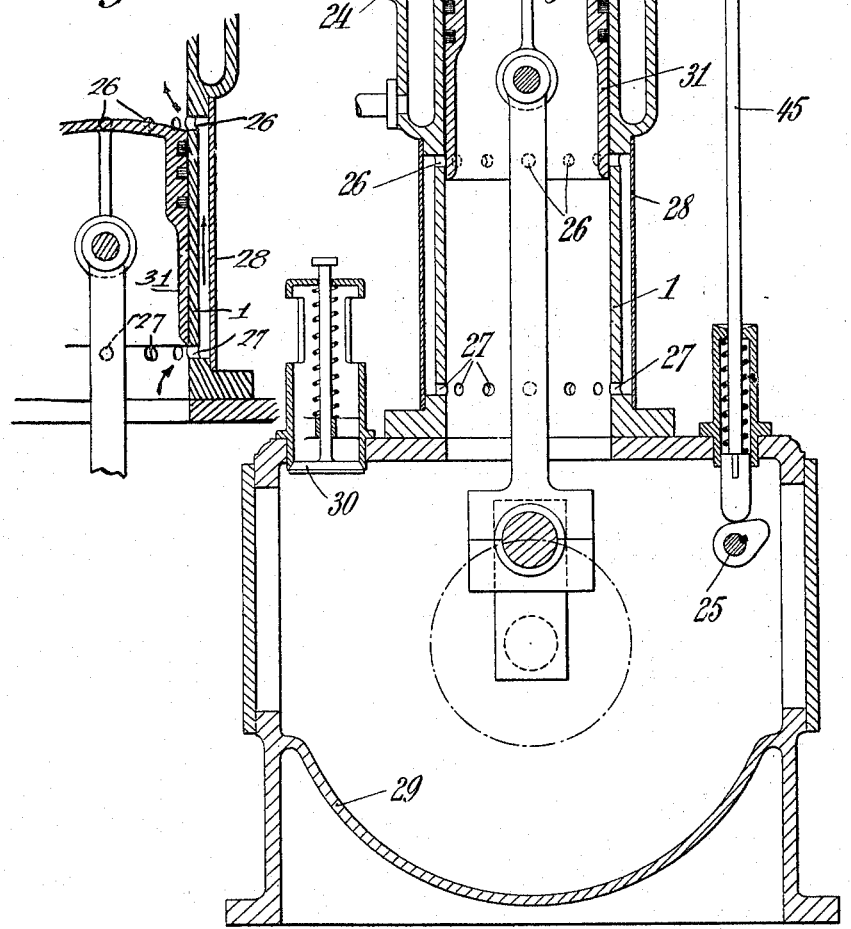
Figure 3:
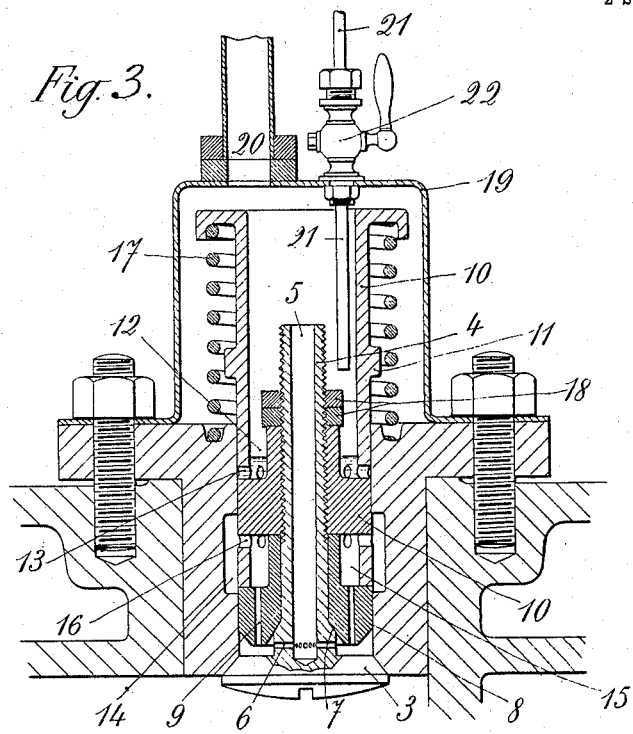
Figure 4:
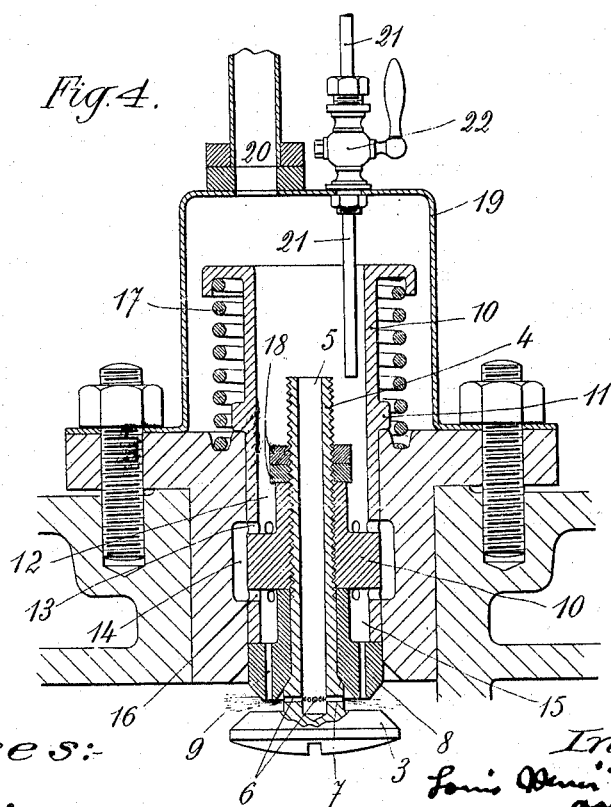

Figure 1 is a vertical section of the engine, certain parts being shown diagrammatically; Fig. 2 is a section of part of the wall of the cylinder, which shows the mode of admitting air at the end of the downward stroke; Fig. 3 shows in section the closed admission valve; Fig. 4 is a similar view showing the valve open.

The cylinder 1 has at its upper end 2 an admission valve 3, the stem 4 of which (Figs. 3, 4) has an axial bore 5 with small radial bores 6 near the valve. A shoulder 7 of the stem supports an annular piece 8 having small bores 9 parallel to the axis of the valve stem. There are as many of these bores as there are bores 6; the axis of each bore 9 intersects that of the corresponding bore 6, the mouth of the bore 9 being level with the axis of the bore 6. A slide 10 is screwed on the stem and fastened by two nuts 18; it has a shoulder 11 to limit its stroke and is hollowed to form an annular cavity 12 at the base of which perforations 13 make communication with an annular cavity 14 in the valve casing when the valve is open. The slide 10 also forms in conjunction with the annular piece 8, a chamber 15 having at its upper part bores 16 which establish communication with the cavity 14. A spring 17 for the valve 3 bears against a flange at the upper end of the slide 10. The whole of these parts is preferably covered by a cap 19 to which air or gas is supplied through a pipe 20, and the liquid combustible through a pipe 21 controlled by a cock 22. This casing might be dispensed with, and the valve would then draw in fresh air from the atmosphere.

In the head 2 of the cylinder (Fig. 1) there are also the ignition plug 23 and the exhaust valve 24, the latter being controlled in the usual manner by the shaft 25. The cylinder 1 has two series of openings 26 and 27 forming communication with an annular chamber formed by a casing 28. In the crank casing 29 is arranged an automatic inlet valve 30 and the upward stroke of the piston 31 draws air into the crank casing through this valve, while the downward stroke compresses this air which passes into the cylinder 1 as shown by the arrows in Fig. 3.

The petroleum is supplied under pressure to the motor by the conduit 42. The admission of the petroleum arriving in pipe 42 is controlled by a check valve 43 (Fig. 1) held down by a spring and opened at every second revolution by a tappet 44 on the rod 45 which is operated by shaft 25. The rod 45 also serves to open the exhaust valve 24. Any other device might obviously be used for controlling admission of the petroleum.

The operation of the engine is as follows: Assuming the parts to be in the position shown at Fig. 1, and that this is the beginning of the suction stroke, when piston 31 moves downward the pressure in the cylinder falls and valve 3 opens rapidly. The petroleum previously supplied to chamber 12 through pipe 21 is drawn in accompanied or immediately followed by air which has entered at 20. In chamber 14 the air mixes with the petroleum and the mixture passes into the communication ports as an emulsion of petroleum and air. A further emulsification occurs as the mixture passes into the chamber 15. This mixture now passes through bores 9 and is pulverized by the jets of air meeting it at right angles from the bores 6; thus the petroleum enters the cylinder through valve 3 in a finely pulverized state. If the pressure or the opening for admitting air is suitably selected or adjusted petroleum will be drawn in during the whole stroke of the piston. The air compressed by the piston on its down stroke in the crank casing 29 passes at the end of the stroke into the cylinder through perforations 26 and 27 where it mixes with the pulverized petroleum and renders the combustible mixture perfectly homogeneous. At the beginning of the compression, valve 3 closes, and perforations 13 are closed also, so that the petroleum only circulates in the passages of the valve at the very moment of admission, which, owing to the violence and suddenness of the admission, produces thorough intermixture of the air and the petroleum. The compressed mixture is ignited by the plug 43. The hot gases cannot cause any damage to the fine openings of the pulverizer, because the gases do not have access to these parts. During the expansion and exhaust strokes of the piston, the admission valve remains closed under the action of its spring and the pressure of the gases. At the end of the piston stroke air enters through the orifices in the cylinder and expels the residues of combustion.

Although the invention has been described with reference to heavy oils, especially petroleum, it may also be applied with any other carbureting liquid whatever its degree of volatility.

Having thus described the nature of our said invention and the best means we know of carrying the same into practical effect, we claim:—

1. In an internal combustion motor of the four-cycle type, an intake valve provided with a plurality of conduits, means for introducing hydrocarbon into certain of the conduits, the said conduits being so arranged that the intake stroke of the piston sucks air and hydrocarbon through said conduits in order to intimately mix the two, and means for introducing air for supporting combustion at the end of the intake stroke of the piston.

2. In a four cycle internal combustion engine, an inlet valve provided with a plurality of passages, means for introducing air to all these passages, means for introducing hydrocarbon to some of the passages, the said passages being so arranged that the suction stroke of the engine piston will draw air and hydrocarbon through some of them for mingling the two, and draw pure air through the other passages and cause it to impinge against the mingled air and hydrocarbon for atomizing it, and means for introducing air to support combustion into the cylinder at the end of the suction stroke of the piston.

3. In a four cycle internal combustion engine, an automatic inlet valve having a hollow stem provided with orifices through the walls thereof, a slide exterior to the stem and forming passages between it and the stem, which passages terminate near said orifices, means for supplying air to the hollow stem, means for supplying air and hydrocarbon to the passages around the stem, whereby the suction stroke of the engine piston will mingle and atomize the combustible charge and draw it into the cylinder.

4. In a four cycle internal combustion engine, an automatic inlet valve having a hollow stem provided with orifices through the walls thereof, a slide exterior to the stem and forming passages between it and the stem, which passages terminate near the said orifices, means for supplying air to the hollow stem, means for supplying air and hydrocarbon to the passages around the stem, whereby the suction stroke of the engine piston will mingle and atomize the combustible charge and draw it into the cylinder and means for introducing air to support combustion into the cylinder at the end of the suction stroke of the piston.

5. In a four cycle internal combustion engine, an automatic inlet valve having a hollow stem provided with constricted transverse orifices through the walls thereof, a slide exterior to the stem and forming passages between it and the stem and provided with constricted longitudinal bores communicating with the said passages and terminating near the said orifices, means for supplying air to the hollow stem and means for supplying air and hydrocarbon to the passages around the stem, whereby the suction stroke of the engine piston will mingle and atomize the combustible charge and draw it into the cylinder, and means for introducing air to support combustion into the cylinder at the end of the suction stroke of the engine.

6. In a four cycle internal combustion engine, an inlet valve having a hollow stem provided with constricted transverse orifices through the walls thereof, a slide exterior to the stem and forming separate passages between it and the stem and provided with constricted longitudinal bores communicating with one of said separate passages and terminating near the said orifices, means for supplying air to the hollow stem and means for supplying air and hydrocarbon to the other of said separate passages around the stem, a valve casing provided with annular recesses therein arranged to open communication between the said separate passages around the stem when the valve is open, whereby the suction stroke of the engine piston will mingle and atomize the combustible charge and draw it into the cylinder, and means for introducing air to support combustion at the end of the suction stroke of the piston.

In testimony, that we claim the foregoing as our invention, we have signed our names in presence of two witnesses, this 5th day of August 1909.

LOUIS HENRI LIBERT BELLEM.
GASTON JEAN-BAPTISTE BRÉGÉRAS.

Witnesses:
H. C. COXE,
ALCIDE FABE.